(12) United States Patent
Meinholz et al.

(10) Patent No.: US 11,645,428 B1
(45) Date of Patent: May 9, 2023

(54) QUANTUM PHENOMENON-BASED OBFUSCATION OF MEMORY

(71) Applicant: Wells Fargo Bank, N.A., San Francisco, CA (US)

(72) Inventors: Michael Erik Meinholz, San Francisco, CA (US); Peter Bordow, San Francisco, CA (US); Robert L. Carter, Jr., San Francisco, CA (US); Pierre Arbajian, San Francisco, CA (US); Jeff J. Stapleton, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 411 days.

(21) Appl. No.: 16/787,244

(22) Filed: Feb. 11, 2020

(51) Int. Cl.
*H04L 9/08* (2006.01)
*G06F 21/79* (2013.01)
*G06N 10/00* (2022.01)
*H04L 9/06* (2006.01)

(52) U.S. Cl.
CPC .............. *G06F 21/79* (2013.01); *G06N 10/00* (2019.01); *H04L 9/0618* (2013.01); *H04L 9/0852* (2013.01); *H04L 2209/16* (2013.01)

(58) Field of Classification Search
CPC ....... G06F 21/79; G06N 10/00; H04L 9/0618; H04L 9/0852; H04L 2209/16
See application file for complete search history.

(56) References Cited

U.S. PATENT DOCUMENTS

| | | | | |
|---|---|---|---|---|
| 6,101,546 A | * | 8/2000 | Hunt | H04N 21/2368 709/236 |
| 8,019,788 B1 | * | 9/2011 | Carter | H03M 7/30 707/602 |
| 8,261,097 B2 | * | 9/2012 | Kubo | H04L 9/0897 380/231 |
| 8,713,330 B1 | * | 4/2014 | Sommer | G06F 11/1048 713/193 |
| 8,726,037 B2 | | 5/2014 | Pean et al. | |
| 8,751,830 B2 | | 6/2014 | Muff et al. | |

(Continued)

OTHER PUBLICATIONS

Das et al. "Detecting/Preventing Information Leakage on the Memory Bus due to Malicious Hardware" [Online], Apr. 29, 2010 [Retrieved on: May 2, 2022], Retrieved from: <https://ieeexplore.ieee.org/stamp/stamp.jsp?tp=&arnumber=5456930> (Year: 2010).*

*Primary Examiner* — Eric W Shepperd
(74) *Attorney, Agent, or Firm* — Womble Bond Dickinson (US) LLP

(57) ABSTRACT

Systems, apparatuses, methods, and computer program products are disclosed for hardware-level encryption. An example method includes receiving an instance of information/data by processing circuitry; and disassembling, by the processing circuitry, the instance of information/data into a plurality of sections. The processing circuitry assigns each section of the plurality of sections a location in an allocated portion of memory. The locations are determined based at least in part on a quantum obfuscation map (QOM). The QOM is generated based on one or more quantum obfuscation elements (QOEs) corresponding to a quantum state of a quantum particle. The processing circuitry then causes each of the plurality of sections to be stored at the corresponding assigned location in the allocated portion of the memory.

20 Claims, 6 Drawing Sheets

(56) References Cited

U.S. PATENT DOCUMENTS

| | | | |
|---|---|---|---|
| 8,930,714 B2 | 1/2015 | Glew et al. | |
| 8,954,755 B2 | 2/2015 | Muff et al. | |
| 9,128,876 B2 | 9/2015 | Cordella et al. | |
| 9,313,180 B1* | 4/2016 | Gray | H04L 9/0855 |
| 9,336,160 B2 | 5/2016 | Hawkes et al. | |
| 10,176,121 B2 | 1/2019 | Gammel | |
| 10,261,919 B2 | 4/2019 | Ndu et al. | |
| 11,356,247 B1* | 6/2022 | Carter, Jr. | H04L 9/0656 |
| 11,494,681 B1* | 11/2022 | Peterson | G06F 8/427 |
| 2002/0146019 A1* | 10/2002 | Malzahn | G06F 12/1408 |
| | | | 370/402 |
| 2004/0053654 A1* | 3/2004 | Kokumai | G06F 21/36 |
| | | | 463/1 |
| 2006/0233360 A1* | 10/2006 | Gammel | H04L 9/065 |
| | | | 380/37 |
| 2007/0172053 A1 | 7/2007 | Poirier | |
| 2009/0125753 A1* | 5/2009 | Kryka | G06F 11/1068 |
| | | | 711/170 |
| 2010/0121631 A1* | 5/2010 | Bonnet | G06V 30/274 |
| | | | 704/9 |
| 2012/0033809 A1* | 2/2012 | Huang | H04L 9/0816 |
| | | | 380/46 |
| 2013/0205139 A1* | 8/2013 | Walrath | G06F 21/72 |
| | | | 713/190 |
| 2013/0262880 A1* | 10/2013 | Pong | G06F 12/1408 |
| | | | 713/193 |
| 2014/0047549 A1* | 2/2014 | Bostley, III | G06F 21/79 |
| | | | 726/26 |
| 2015/0036819 A1* | 2/2015 | Arahira | H04L 9/0858 |
| | | | 380/44 |
| 2015/0095661 A1 | 4/2015 | Sell et al. | |
| 2016/0092674 A1* | 3/2016 | Hughes | G06F 21/52 |
| | | | 726/22 |
| 2017/0093823 A1 | 3/2017 | Gopal et al. | |
| 2017/0147509 A1 | 5/2017 | Nevers et al. | |
| 2017/0163415 A1* | 6/2017 | Gray | H04B 10/70 |
| 2017/0169255 A1* | 6/2017 | Lin | G06F 21/79 |
| 2017/0201503 A1 | 7/2017 | Jayasena et al. | |
| 2017/0214701 A1* | 7/2017 | Hasan | H04L 63/1491 |
| 2017/0371809 A1 | 12/2017 | Benedict | |
| 2018/0081825 A1* | 3/2018 | Aschauer | G06F 12/1408 |
| 2020/0065256 A1* | 2/2020 | Palmer | G06F 16/2246 |
| 2020/0278937 A1* | 9/2020 | Durham | G06F 12/1408 |
| 2020/0326977 A1* | 10/2020 | Gambetta | G06F 9/5044 |
| 2020/0328886 A1* | 10/2020 | Newton | H04L 9/0858 |
| 2021/0319145 A1* | 10/2021 | Best | G06F 21/85 |

\* cited by examiner

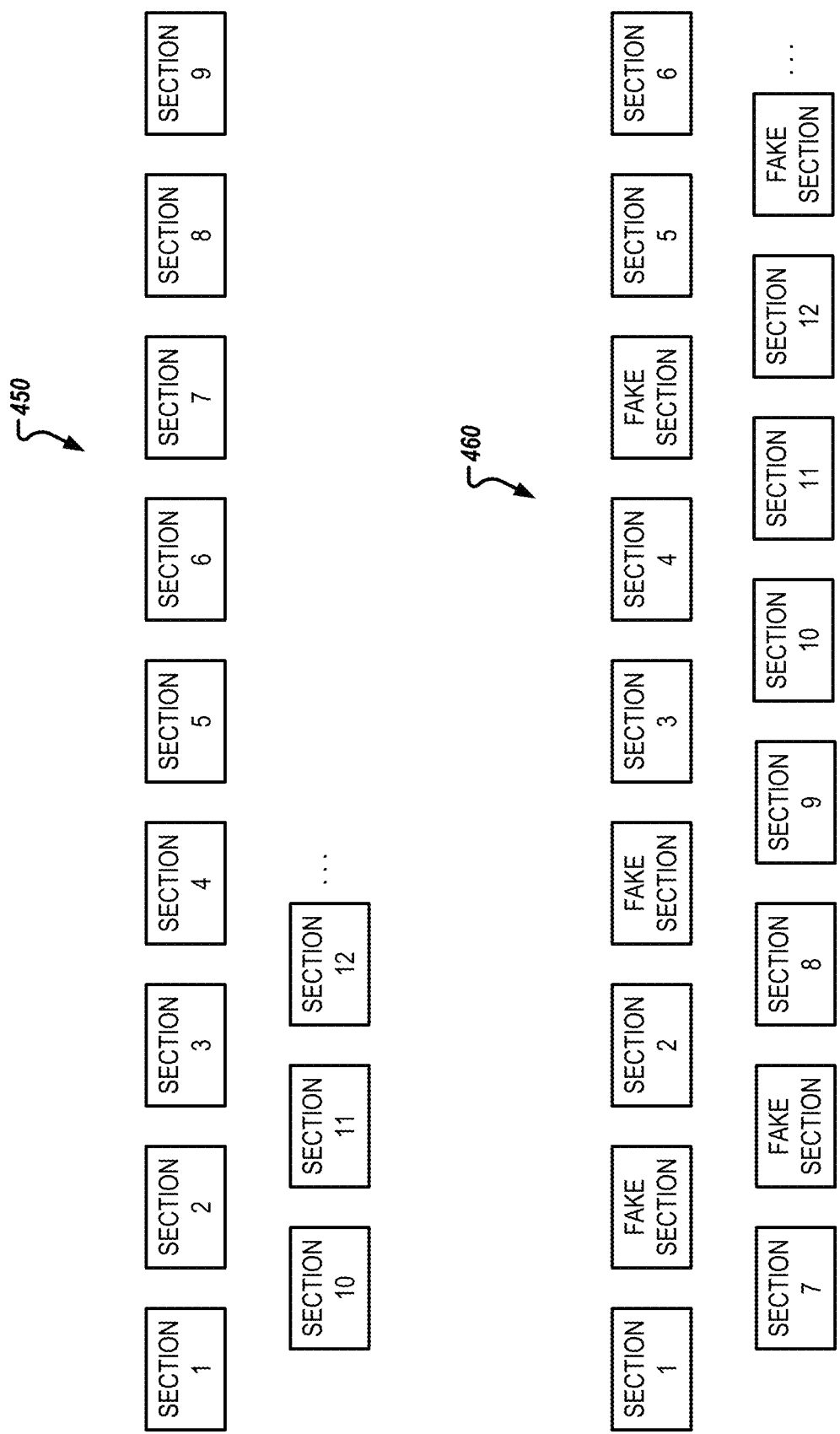

QUANTUM PHENOMENON-BASED OBFUSCATION OF MEMORY

TECHNOLOGICAL FIELD

Example embodiments of the present disclosure relate generally to cryptography and, more particularly, to systems and methods for providing post-quantum cryptography (PQC). For example, example embodiments relate to quantum phenomenon-based obfuscation of memory for secure storage of information/data and/or the like.

BACKGROUND

Although still in its infancy, quantum computing and its boundless potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Further, two or more qubits may be entangled so that their physical properties are correlated even when separated by large distances, and quantum computers may simultaneously perform a vast number of operations on these entangled qubits. This massive parallelism allows quantum computers to perform incredibly complex calculations at speeds unimaginable today and solve certain classes of problems that are beyond the capability of today's most powerful supercomputers.

Reflecting this broad potential impact, companies from a variety of market sectors are investing substantial resources to develop these promising quantum computing theories into real-world quantum computing capabilities. However, this heightened interest and investment has yet to produce an enduring and functional quantum computer outside of a laboratory environment.

Nonetheless, there is widespread agreement among experts that quantum computers will disrupt current security protocols that protect global financial markets and governmental institutions. For example, most common public-key cryptography schemes, such as the widely-used Rivest-Shamir-Adleman (RSA) and Diffie-Hellman (DH) schemes, rely on the inability of classical computers to complete certain types of complex mathematical calculations, such as integer factorization and discrete logarithm computation, respectively, within a reasonable amount of time. A quantum computer implementing Shor's algorithm potentially could complete these complex calculations in a relatively short time and thereby determine the private keys used for current public-key systems from the corresponding public keys. Accordingly, there is an urgent need for data owners and hosting services to begin migrating their data and upgrading their systems to use quantum-resistant algorithms before quantum computing capabilities are realized. However, the sheer volume of this data and complexity of these systems presents myriad challenges to any such migration plan.

BRIEF SUMMARY

Computing systems, computing apparatuses, computer-implemented methods, and computer program products are disclosed herein for improving the security of information/data stored in memory, disk storage, and/or the like. In an example embodiment, the memory is in use memory. In various embodiments, the information/data may include data elements, files, program and/or executable code, and/or other digital information/data. In some embodiments, the PQC-enabled system provided herein solves the above problems by performing a quantum phenomenon-based obfuscation of memory of the system for securely storing instances of information/data. For example, an instance of information/data may be stored in random access memory (RAM) or other memory using, for example, using quantum phenomenon-based obfuscation that prevents unauthorized access of the instance of information/data. For example, the use of the quantum phenomenon-based obfuscation of memory may cause portions or sections of the instance of information/data to be stored at locations within the memory that are not identifiable via unauthorized access attempts. In an example embodiment, multiple instances of information/data are stored within the memory using the quantum phenomenon-based obfuscation.

In one example embodiment, a system is provided for storing one or more instances of information/data using quantum phenomenon-based obfuscation of memory. In various embodiments, the quantum phenomenon-based obfuscation of memory includes protecting instances of information/data by hiding the information/data within volatile or non-volatile memory by, for example, obscuring the address(es) where portions of the information/data are stored in the volatile or non-volatile memory. The system may comprise cryptographic circuitry (and/or other hardware and/or software modules configured to perform cryptographic functions) configured to generate and/or store one or more quantum obfuscation elements (QOEs) and/or generate and/or store a quantum obfuscation map (QOM) based on one or more QOEs. The QOM may be used in storing data using quantum phenomenon-based obfuscation. The system may further comprise memory. The system may further comprise processing circuitry configured to receive an instance of information/data; disassemble the instance of information/data into a plurality of sections; for each of the plurality of sections, assign a location in an allocated portion of the memory, the locations determined based at least in part on the QOM; and cause each of the plurality of sections to be stored at the corresponding assigned location in the allocated portion of the memory.

In an example embodiment, a computing device configured to store instances of information/data using quantum phenomenon-based obfuscation of memory is provided. In an example embodiment, the computing device comprises processing circuitry, cryptographic circuitry (and/or other hardware and/or software modules configured to perform cryptographic functions) configured to store and/or generate a QOM, and memory storing computer executable instructions. The QOM is generated based on one or more quantum obfuscation elements (QOEs) corresponding to a quantum state of a quantum particle. The computer executable instructions are configured to, when executed by the processing circuitry, cause the computing device to at least receive, by the processing circuitry, an instance of information/data; disassemble the instance of information/data into a plurality of sections; for each of the plurality of sections, assign a location in an allocated portion of the memory, the locations determined based at least in part on the QOM; and cause each of the plurality of sections to be stored at the corresponding assigned location in the allocated portion of the memory.

In an example embodiment, a method for storing an instance of information/data using quantum phenomenon-based obfuscation of memory is provided. The method comprises receiving, by processing circuitry, the instance of information/data; disassembling, by the processing circuitry, the instance of information/data into a plurality of sections; for each of the plurality of sections, assigning, by the processing circuitry, a location in an allocated portion of memory, the locations determined based at least in part on a QOM; and causing, by the processing circuitry, each of the plurality of sections to be stored at the corresponding assigned location in the allocated portion of the memory. The QOM is generated based on one or more QOEs corresponding to a quantum state of a quantum particle.

In another example embodiment, a computer program product is provided for storing instances of information/data using quantum phenomenon-based obfuscation of memory. The computer program product comprises at least one non-transitory computer-readable storage medium storing computer executable instructions that, when executed by processing circuitry, may cause a system to receive an instance of information/data. The computer executable instructions, when executed by the processing circuitry, may further cause the system to disassemble the instance of information/data into a plurality of sections. The computer executable instructions, when executed by the processing circuitry, may further cause the system to, for each of the plurality of sections, assign a location in an allocated portion of the memory. The locations are determined based at least in part on a QOM. The QOM is generated based on one or more quantum obfuscation elements (QOEs) corresponding to a quantum state of a quantum particle. The computer executable instructions, when executed by the processing circuitry, may further cause the system to cause each of the plurality of sections to be stored at the corresponding assigned location in the allocated portion of the memory.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

FIG. 4A is a block diagram illustrating an example stream of sections and a modified stream of sections, according to an example embodiment.

DETAILED DESCRIPTION

Figure 1:
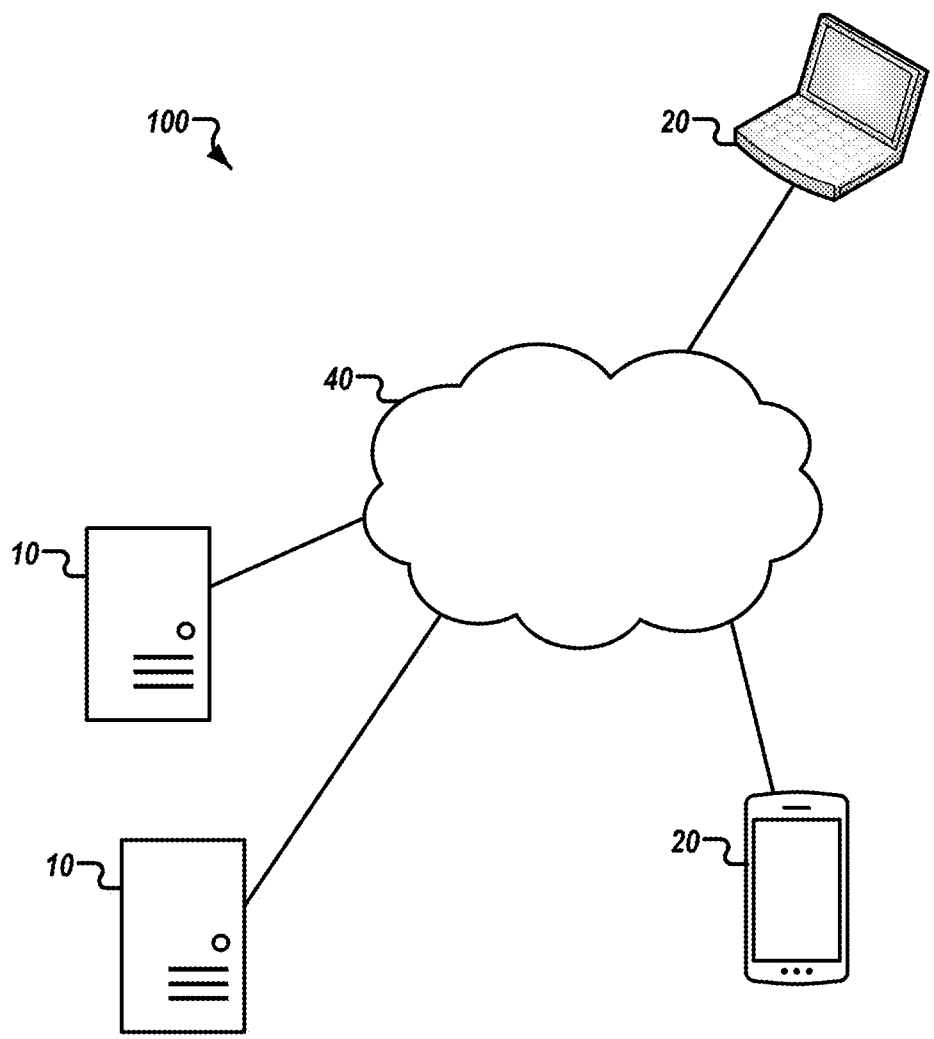
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for a quantum phenomenon-based obfuscation of memory for secure storage of instances of information/data. In various embodiments, the quantum phenomenon-based obfuscation of memory may be quantum-resistant and/or use a PQC cryptographic technique to securely store information/data. In various embodiments, the instances of information/data are securely stored without changing the information/data. For example, in various embodiments, an instance of information/data may be disassembled and/or divided into sections. The sections may then be assigned locations within a memory based on one or more QOEs and/or cryptographic techniques. When the sections of the instance of information/data are stored in the assigned locations, unauthorized attempts to access the instance of information/data are unable to reassemble the instance of information/data.

Although quantum computers capable of disrupting classical encryption schemes are still believed to be several years away, the threat of a "harvest now and decrypt later attack" makes quantum computing an immediate real threat, even if the threat will not be actionable until a sufficiently robust quantum computer is developed in the future. The "harvest now and decrypt later attack" is a long-game attack where a bad actor scrapes, collects, or harvests (e.g., records and stores) encrypted data, such as data streaming through the Internet or cloud, by the way of breaches or passive interception and then hoard the encrypted data, waiting for the day when quantum computers can determine the cryptographic keys to the harvested data. This bad actor could be storing data to or from a specific website, server, email client, or other target of attack or, given sufficient motivation and resources, recording petabytes of data each hour from general internet traffic. Once quantum computers are capable of determining the cryptographic keys associated with the harvested encrypted data, the bad actor might use those cryptographic keys to decrypt the previously encrypted data. For instance, persistent data, such as mortgage information and financial records, encrypted or digitally signed with today's cryptographic algorithms will be at risk even if the necessary quantum computing technology is not available for seven to ten years or even later. Subsequently, with advancements in artificial intelligence and machine learning and the exponential increase in data processing compute power, a bad actor could attack a data vault to extract meaningful information from the decrypted petabytes of data.

For example, if the memory was accessed via a "harvest now and decrypt later attack," the locations at which the sections of the instance of information/data are stored will not be (easily and/or timely) determinable. Thus, the attackers will not be able to (easily and/or timely) reconstruct the instance of information/data from the bits stored in the memory itself. For example, the QOM, one or more QOEs used to generate the QOM, and/or information/data related thereto may not be stored in the memory itself so that simply having a read out of the memory does not provide sufficient pointers as to which address of the memory store sections corresponding to the instance of information/data and the order in which such sections should be reassembled to provide the instance of information/data. Thus, an attacker would need to physically be in ownership of the memory chip and/or motherboard of the corresponding computing entity so that the attacker could determine the locations in the memory storing the sections of the information/data and the order in which the sections should be re-assemble to reconstruct the instance of information/data.

In various embodiments, additional measures may be taken to apply further levels of protection for instances of information/data. For example, the processor of a computing entity may provide the sections of the instance of information/data to a memory (e.g., RAM or other memory) via a data bus and/or the like for storage in the memory as a stream of sections. In various embodiments, the sections of the instance of information/data may be stored in any volatile or non-volatile memory (e.g., computer memory, disk storage, and/or the like). In an example embodiment, the processor and/or other processing entity may select one or more sections from the stream of sections to encrypt via one or more encryption methods (e.g., classical encryption methods and/or PQC encryption methods). In an example embodiment, the data bus may condition the stream of sections. For example, the data bus may add one or more fake sections to the stream of sections, reorder one or more sections within the stream of sections, and/or the like. A quantum obfuscation map (QOM) may then be used to assign a location within the memory to store each of the sections of the stream of sections. For example, the QOM may define a path of locations within the memory such that each section may be assigned a location within the memory in accordance with the order of the sections in the stream. In an example embodiment, the QOM may act to scramble memory addresses and/or enact a re-addressing scheme for the memory. In an example embodiment, the QOM defines the path of locations for the stream of sections based on one or more QOEs. For example, a QOE may be a key corresponding to a PQC encryption technique, a quantum random walk, an initial state of a quantum coin flip, quantum random number, a collapsed wave function describing a state of a quantum particle, and/or the like.

A collapsed wave function describing a state of a quantum particle is the result of an observation of the state of the quantum particle. In quantum mechanics, wave function collapse occurs when a wave function—initially in a superposition of several eigenstates of the quantum particle—reduces to a single eigenstate due to interaction with the external world. This interaction is called an "observation". It is the essence of a measurement in quantum mechanics which connects the wave function with classical observables like position and momentum. In various embodiments, the one or more QOEs may be used to generate a QOM using a QOM generating algorithm. In an example embodiment, the network device comprises PQC cryptographic circuitry configured to contain and perform an observation of the quantum particle. In an example embodiment, a second quantum particle that is entangled with the quantum particle contained by the PQC cryptographic circuitry is stored in a quantum particle vault (e.g., by a master server). Various QOM generating algorithms may be used in various embodiments. A QOM generating algorithm receives as input one or more QOEs and provides as output a QOM. In various embodiments, the QOM is an addressing map of byte locations. For example, the QOM may be a map to how the memory is used. The map may be unique to the particular memory (e.g., block of memory, memory chip, and/or the like).

In an example embodiment, a portion of the memory is allocated for storage of the instance of information/data. In various embodiments, the portion of the memory that is allocated for storage of the instance of information/data is larger than required for storing the stream of sections being provided to the memory. The remainder of the memory within the allocation may be filled with fake sections that may correspond to information/data that is similar to that of the instance of information/data but that does not belong to the instance of information/data. For example, if the instance of information/data comprises a credit card number, the fake sections may comprise portions of information/data that are similar to credit card numbers. For example, the fake sections may include sections corresponding to credit card numbers that are different from the credit card number of the instance of information/data. In various embodiments, the QOM may be periodically and/or randomly changed (e.g., when the network device is turned on, booted up, cold started, restarted, and/or the like) such that the address location scheme is modified.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory, cloud storage, and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "post-quantum cryptography (PQC)" refers to cryptosystems which are, or are considered to be, resistant to quantum attacks. The term "quantum attacks" refers to attack algorithms executing on quantum computers. The term PQC refers to cryptography that will be (and/or is expected to be) secure even after the development of large-scale error-tolerant quantum computers. The related term "PQC migration" refers to the migration from classical cryptography to PQC (e.g., using PQC algorithms) and includes, but is not limited to, the updating of system software stacks, cryptographic hardware and security infrastructures. In some embodiments, PQC migration includes migration of classical cryptography systems to systems employing PQC algorithms or hybrid systems (e.g., a using combination of classical and PQC algorithms). In some embodiments, PQC migration includes translations of networks. For example, today networks A, B, and C may only be able to utilize classic cryptography, but tomorrow network C may be able to utilize PQC so the PQC system may drop in a PQC gateway to translate back and forth such that eventually network B is PQC enabled, but network A may never become PQC enabled so the PQC system may determine that transactions to or from network A are a higher risk and implement the PQC cryptographic techniques described herein according to that higher risk.

The term "quantum basis" refers to sets of orthogonal quantum states, including, but not limited to, pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state $|0\rangle$ and the vertical photon polarization state $|1\rangle$. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state $|L\rangle$ and the right circular photon polarization state $|R\rangle$.

The term "quantum particle" refers to photons, atoms, electrons, molecules, ions, or other suitable particles or quasi-particles (e.g., composite fermions). The term "entangled quantum particle" refers to two or more photons, atoms, electrons, molecules, ions, or other suitable particles or quasi-particles entangled according to the principles of quantum entanglement.

The term "qubit" refers to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state $|1\rangle$ and the spin down state $|0\rangle$); the energy level of a single atom (e.g., a superconducting qubit); the Hall conductance of electron systems (e.g., qubits based on a quantum Hall effect, such as an integer quantum Hall effect, a fractional quantum Hall effect, or a quantum spin Hall effect); the vibration state of a single carbon nanotube or nanoparticle (e.g., a carbon qubit, a carbon nanotube or nanoparticle coupled to a spin qubit, a carbon nanotube or nanoparticle coupled to a superconducting qubit); the electronic state of an ion (e.g., a trapped ion); a transmission line shunted plasma oscillation qubit (e.g., a fixed-frequency transmon qubit, a frequency-tunable transmon qubit); a charge qubit (e.g., a superconducting charge qubit); a defect (e.g., a vacancy, a dopant, or a combination thereof, such as a nitrogen-vacancy center or a silicon-vacancy center) in a diamond structure (e.g., a diamond qubit); or any other suitable qubit. Qubits may exist in multiple states simultaneously and can be made of any suitable quantum particle, including entangled quantum particles. Qubits may exist in multiple states simultaneously and may be made of quantum particles such as photons, atoms, electrons, molecules, ions, or other suitable particles, such as quasi-particles. In some embodiments, qubits may be entangled according to the principles of quantum entanglement. For example, a pair of entangled qubits may comprise a first entangled qubit and a second entangled qubit, where measurement of the first entangled qubit causes the collapse of the second entangled qubit such that the first entangled qubit and the second entangled qubit are equal (e.g., both "0" or both "1") when measured using the same quantum basis.

The term "optical line" refers to an optical communications path. For example, an optical line may comprise an optical fiber, an optical waveguide, a fiberoptic cable, a non-polarization maintaining optical fiber, an optical transmission line, a quantum line, or a combination thereof. The term optical line broadly encompasses on-chip optical lines.

The term "quantum line" refers to a quantum communications path. For example, a quantum line may comprise a polarization-maintaining (PM) optical fiber (PMF or PM fiber), photonic transmission lines, photonic crystals, photonic circuitry, free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible. The term optical line broadly encompasses on-chip quantum lines.

The term "on-chip encoder" and "on-chip decoder" is used herein to refer to any device that respectively encodes or decodes a qubit of information, or in time-bins of information, on a photon or an electron. In this regard, the qubit decoder may comprise an optoelectronic device as described below.

The terms "optoelectronic device," "optoelectronic component," "laser device," "light source," "single photon source," "particle source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. Each of the MZIs disclosed herein may comprise a combination of mirrors, beam splitters, photodetectors fiberoptic cables, lenses, nonlinear crystals, wave plates, motors (e.g., servo motors), motion controllers (e.g., servo motor controllers), temperature controllers (e.g., thermoelectric devices), and any other suitable components arranged to perform the operations and functions disclosed herein, including, but not limited to, the controlling of optical path length. In some embodiments, a first optoelectronic device may include a particle source configured to generate single particles (e.g., photons or electrons) and transmit the generated particles through a double-slit structure to a first electron detector (e.g., "|1>") and a second electron detector (e.g., "|0>") as described herein.

The terms "security shelf-live," "migration time," and "collapse time" refer to the parameters shown below in Table 1:

TABLE 1

Example parameters that may be used by the PQC system described herein to generate quantum computing threat assessments and electronic recommendations associated therewith.

| Parameter | Description | Definition |
|---|---|---|
| x | Security shelf-life (e.g., data retention requirement) | Duration (e.g., in years) to keep the cryptographic keys secure (e.g., "How long do you need your cryptographic keys to remain secure?") |
| y | PQC migration time | Estimated duration (e.g., in years) to migrate existing infrastructure to a PQC system (e.g., "How long will it take to deploy a set of cryptography tools that are quantum-resistant?") |
| z | Collapse time (e.g., time to quantum computing threat) | Estimated duration (e.g., in years) to build a large-scale quantum computer (e.g., "How long will it be before a quantum computer, or some other method, compromises the currently deployed public-key cryptography tools?") |

The term "security shelf-life" includes, but is not limited to, data retention requirements. For example, in some instances the security shelf life x of a piece of data may be based on governmental risk and regulatory requirements, such as the FDIC's data retention requirements shown in Table 1.

The term "collapse time" includes, but is not limited to, time to quantum computing threat. The phrases "time to quantum computing threat" and "a time to a quantum computing threat" refer to an approximate time to a quantum computing threat. In some instances, the collapse time z may decrease when the PQC system identifies, or receives, technological advancements relating to quantum computing; increased vulnerabilities to cryptographic techniques (e.g., one or more non-PQC or classical cryptographic techniques, PQC cryptographic techniques, or hybrid PQC cryptographic techniques); or a quantum computing (QC) detection alert control signal indicating that a particular cryptographic technique (e.g., a non-PQC or classical cryptographic technique, a PQC cryptographic technique, a hybrid PQC cryptographic technique) has been compromised by quantum computing. In one illustrative, non-limiting example, the collapse time z may indicate an estimated 15% chance of compromising RSA-2048 by 2026 and an estimated 50% chance of compromising RSA-2048 by 2031.

The term "control signal" refers to an electronic alert, notification, flag, or control signal configured to instruct, or cause, the PQC system, or a QC detection system comprised by or in communication with the PQC system, to perform an automated process or function without user interactivity. For example, control signals as described herein may comprise QC detection alert control signals, leakage alert control signals, and tampering alert control signals. In some embodiments, a QC detection alert control signal may indicate, for example, that a particular cryptographic technique (e.g., a non-PQC and/or classical cryptographic technique, a PQC cryptographic technique, a hybrid PQC cryptographic technique) used to encrypt or otherwise generate encrypted QC detection data has been compromised by quantum computing. In some embodiments, a leakage alert control signal may indicate, for example, the existence of a data leakage event associated with QC detection data stored in an internal data environment that was never transmitted outside of that internal data environment. In some embodiments, a tampering alert control signal may indicate, for example, the existence of a data tampering event associated with QC detection data, wherein the QC detection data has been altered but signed using the same digital signature. In some embodiments, the QC detection alert control signals, leakage alert control signals, tampering alert control signals, or a combination thereof may instruct, or cause, the PQC system to initiate automated analyses and processes to mitigate the quantum computing threat within a duration of time. In some instances, the PQC system may generate a control signal in accordance with a criteria corresponding to a perceived and/or determined risk level.

The term "quantum computing (QC) detection data" refers to data configured to be used by the PQC system, or a QC detection system comprised by or in communication with the PQC system, to detect the existence and capabilities of quantum computing and, in some instances, the strength of that quantum computing. In some instances, the PQC system may comprise fictitious data, such as fictitious account data, a fictitious code-signing certificate, any other suitable data, or any combination thereof. For example, the QC detection data may comprise fictitious financial account data, a fictitious electronic mortgage document, a fictitious electronic deed, a fictitious electronic loan document (e.g., a fictitious auto loan document, a fictitious personal loan document), a fictitious electronic stock transfer agreement, fictitious identity information, fictitious medical data, fictitious credit card data, any other suitable data, or any combination thereof. The fictitious identity information may comprise, for example, a fictitious name, address, phone number, email address, social security number, driver license number, any other suitable information, or a combination thereof. The fictitious credit card data may comprise, for example, a fictitious credit card number, credit card issuer (e.g., financial institution), cardholder name, cardholder billing address, expiration date, CVV security code, credit card network (e.g., Visa, MasterCard, American Express), EMV (originally Europay, Mastercard, and Visa) chip data, magnetic stripe data, etc.), any other suitable information, or a combination thereof. In another example, the QC detection data may comprise a fictitious code-signing certificate, a fictitious email certificate, a fictitious legally binding electronic signature certificate that represents the digital identity of a signer (e.g., a digital identification (ID) certificate, such as an X.509 certificate), any other suitable information, or a combination thereof.

The term "data environment" refers to internal data environments, external data environments, hybrid data environments, any other suitable environment, or any combination thereof. The internal data environments may comprise, for example, internal information systems, internal data networks, internal data storage devices, any other suitable data environment, or any combination thereof. The external data environments may comprise, for example, content delivery networks (CDNs), cloud service platforms, social media platforms, dark websites, any other suitable data environment, or any combination thereof. For example, the external data environments may comprise a set of websites, such as a set of social media platforms, public websites (e.g., document leaks websites), online repositories (e.g., online file storage and synchronization services, online file hosting services), P2P file sharing networks (e.g., BitTorrent), deep websites, dark websites (e.g., onion addresses that end in the top level domain ".onion"), the Mortgage Electronic Registration System (MERS), CDNs (including, but not limited to, meta-CDNs), cloud service platforms, any other suitable data environment, or any combination thereof.

The term "non-PQC cryptographic technique" refers to a cryptographic technique that is not quantum-resistant. The terms non-PQC cryptographic technique and classical cryptographic technique are used interchangeably herein. Non-PQC cryptographic techniques may comprise, for example, RSA, DH, and other such non-PQC cryptographic algorithms. In some instances, a non-PQC cryptographic technique may be a variant of a non-PQC cryptographic algorithm. For example, a first non-PQC cryptographic technique may be RSA-2048, a second non-PQC cryptographic technique may be RSA-3072, and a third non-PQC cryptographic technique may be RSA-4096, each of which is a different variant of the same non-PQC cryptographic algorithm (e.g., RSA). In another example, a first non-PQC cryptographic technique may be AES-128, and a second non-PQC cryptographic technique may be DH-2048, each of which is a variant of a different non-PQC cryptographic algorithm (e.g., AES, DH). In yet another example, a first non-PQC cryptographic technique may encrypt overhead data based on RSA-2048 and transmit the encrypted data over a non-PQC communications channel (e.g., an in-band communications channel), and a second non-PQC cryptographic technique may transmit overhead data over a non-PQC communications channel as clear text, each of which is a different variant of a non-PQC communications channel-based cryptographic technique.

The term "PQC cryptographic technique" refers to a quantum-resistant cryptographic technique. Generally, the families of PQC cryptographic techniques include key management and signature. PQC cryptographic techniques may comprise, for example, hash-based PQC cryptographic techniques, lattice-based PQC cryptographic techniques, isogeny-based PQC cryptographic techniques, code-based PQC cryptographic techniques, multivariate-based PQC cryptographic techniques, zero-knowledge proof PQC cryptographic techniques, PQC communications channel-based cryptographic techniques, and other suitable techniques. In some instances, a PQC cryptographic technique may be a variant of a PQC cryptographic algorithm. For example, a first PQC cryptographic technique may be Dilithium II, a second PQC cryptographic technique may be Dilithium II, and a third PQC cryptographic technique may be Dilithium 128, each of which is a different variant of the same PQC cryptographic algorithm (e.g., Dilithium). In another example, a first PQC cryptographic technique may be LUKE, and a second PQC cryptographic technique may be Dilithium II, each of which is a variant of a different PQC cryptographic algorithm (e.g., NewHope, Dilithium). In yet another example, a first PQC cryptographic technique may encrypt payload data based on Dilithium II and transmit the encrypted data over a PQC communications channel (e.g., a PQC back channel), and a second PQC cryptographic technique may generate a secret key that is used to encrypt payload data based on AES-256 and transmit the encrypted data over a PQC communications channel, each of which is a different variant of a PQC communications channel-based cryptographic technique.

The term "hybrid PQC cryptographic technique" refers to a cryptographic technique that comprises a non-PQC cryptographic technique and a PQC cryptographic technique. For example, a hybrid PQC cryptographic technique may comprise a PQC cryptographic technique and non-PQC cryptographic technique coexisting in a data envelope, as defined by the statement "hybrid PQC cryptographic technique={PQC cryptographic technique, Non-PQC cryptographic technique}." In some embodiments, a hybrid PQC cryptographic technique may comprise a hybrid PQC cryptographic mode, such as a signature-based hybrid PQC cryptographic mode consisting of a non-PQC cryptographic signature and a PQC cryptographic signature. In some embodiments, the hybrid PQC cryptographic mode is valid only if both the non-PQC cryptographic signature and the PQC cryptographic signature are valid. For example, the PQC system may (i) validate the non-PQC cryptographic signature according to the Federal Information Processing Standard (FIPS) publication 140 (e.g., 140-1, 140-2, 140-3); and (ii) validate the PQC cryptographic signature using multiple public-key algorithms for X.509 certificates, such as quantum-resistant X.509 Multiple Public Key Algorithm Certificates.

The term "quantum cryptographic technique" refers to a quantum particle-based cryptographic technique. Quantum cryptographic techniques may comprise, for example, quantum key distribution (QKD) techniques, quantum coin flipping protocols, quantum commitment protocols, quantum oblivious transfer protocols, and other suitable techniques. In some instances, a quantum cryptographic technique may be a variant of a quantum cryptographic algorithm. For example, a first quantum cryptographic technique may be a BB84-based QKD technique, a second quantum cryptographic technique may be an E91-based QKD technique, and a third quantum cryptographic technique may be a KMB09-based QKD technique, each of which is a different variant of the same quantum cryptographic algorithm (e.g., QKD).

The term "non-PQC communications channel" refers to a communications channel (e.g., a wired or wireless communications channel) over which non-quantum data and signals are exchanged using one or more non-PQC cryptographic techniques that do not themselves directly rely on quantum properties. For example, the PQC system described herein may implement a non-PQC communications channel by encrypting data based on a non-PQC cryptographic technique (e.g., RSA) and then transmitting the encrypted data over a non-PQC communications channel (e.g., an "in-band" communications channel) or, in some instances, by transmitting unencrypted, clear text data over the non-PQC communications channel. In some embodiments, a non-PQC communications channel may be a classical communications channel derived from a shared secret that is derived using a non-PQC cryptographic technique, such as a shared secret generated using DH.

The term "PQC communications channel" refers to a communications channel (e.g., a wired or wireless communications channel) over which non-quantum data and signals are exchanged using one or more PQC cryptographic techniques (e.g., for authentication, encryption, or both) that do not themselves directly rely on quantum properties. For example, the PQC system described herein may implement a PQC communications channel by encrypting data based on a PQC cryptographic technique (e.g., Dilithium II) and then transmitting the encrypted data over a classical back channel (e.g., an "out-of-band" communications channel). In some embodiments, a PQC communications channel may be based on an underlying Key Encapsulation Mechanism or Key Agreement Scheme. In some embodiments, a PQC communications channel may use a Key Encapsulation Mechanism (e.g., SIKE, NTRUPrime, Kyber) to encapsulate a shared secret and ensure its safe transmission between Alice and Bob. This shared secret subsequently will either (i) be used as a Symmetric Key (e.g., for Symmetric Key encryption) or (ii) be handed over to a Key Derivation Function to generate a shared encryption key. In some embodiments, a PQC communications channel may use a Key Agreement Scheme (e.g., SIDH, NewHopeDH) may allow both Alice and Bob to calculate the shared secret based on public parameters and public key that they exchange. Unlike Key Encapsulation Mechanisms, Key Agreement Schemes do not encapsulate the calculated shared secret with cipher text. Key Agreement Schemes may be extended to generate Ephemeral keys. In some instances, after the shared secret is calculated, the keys are destroyed to preserve perfect forward secrecy. In some embodiments, a PQC communications channel may be a classical communications channel derived from a shared secret that is derived using a Key Encapsulation Mechanism or a Key Agreement Scheme.

The term "quantum communications channel" refers to a quantum communications channel (e.g., an optical line, a quantum line) over which quantum data and particles, such as qubits, are exchanged using one or more quantum cryptographic techniques (e.g., QKD) that directly rely on quantum properties, such as quantum uncertainty, quantum entanglement, or both.

Having set forth a series of definitions called-upon throughout this application, an example system architecture is described below for implementing example embodiments and features of the present disclosure.

System Architecture

Example embodiments described herein may be implemented using any of a variety of computing entities, computing devices, servers, and/or the like. To this end, FIG. 1 illustrates an example environment 100 within which embodiments of the present disclosure may operate to store instances of information/data using hardware-level encryption. As illustrated, the example embodiment 100 may include one or more system devices 10 and one or more client devices 20. The one or more network devices 10 and/or one or more client devices 20 may be in electronic communication with, for example, one another over the same or different wireless or wired networks 40. For example, a client device 20 may provide (e.g., transmit, submit, and/or the like) a one or more instances of information/data and/or one or more requests to access one or more instances of information/data to a network device 10 via one or more wireless or wired networks 40. For example, a network device 10 may receive, securely store, and/or provide (e.g., transmit) instances of information/data to a user computing entity 20 via one or more wireless or wired networks 40. In various embodiments, a network device 10 may also generate and/or provide one or more instances of information/data to be securely stored and/or may generate requests to access one or more instances of information/data. In various embodiments, a client device 20 may also securely store one or more instances of information/data using a hardware-level encryption of an example embodiment.

Figure 2:
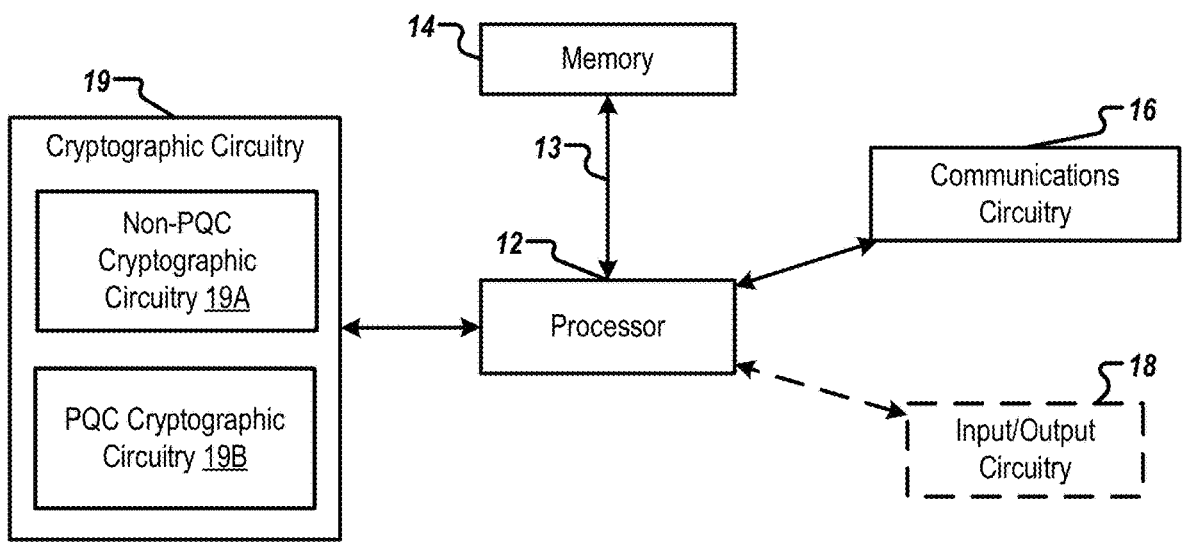
FIG. 2 is a block diagram of a network device that may be specifically configured in accordance with an example embodiment described herein.

The one or more network devices 10 may be embodied as one or more servers, such as that described below in connection with FIG. 2. The one or more network devices 10 may further be implemented as such as one or more servers, local servers, remote servers, cloud-based servers (e.g., cloud utilities), or other network entities, and configured to communicate with one or more devices, such as one or more server devices, client devices, database server devices, remote server devices, other suitable devices, or a combination thereof. In various embodiments, a network device 10 may store and/or be in communication with one or more databases. In an example embodiment, the one or more databases may be embodied as one or more data storage devices, such as a Network Attached Storage (NAS) device or devices, or as one or more separate databases or servers. The one or more databases may store information accessed by the network device 10 to facilitate the operations of securely storing instances of information/data using a hardware-level encryption of an example embodiment. For example, the one or more databases may store control signals, device characteristics, and access credentials for one or more of the client devices 20.

The one or more client devices 20 may be embodied by any computing devices known in the art, such as those described below in connection with FIG. 3. For example, in example embodiments a client device 20 may be any of a variety of stationary or mobile computing devices, such as a mobile telephone, smartphone, smartwatch, smart speaker, portable digital assistant (PDA), tablet computer, laptop computer, desktop computer, kiosk computer, automated teller machine (ATM), point of sale (PoS) device, electronic workstation, any other suitable computing device, or any combination of the aforementioned devices. The network device 10 may receive instances of information/data from, and transmit instances of information/data to, the one or more client devices 20. For example, the network device 10 may receive a request for one or more instances of information/data securely stored by the network device. The request may be generated and provided by the network device 10 itself, another network device 10, and/or a client device 20. For example, the network device 10 may provide securely store instances of information/data using a hardware-level encryption. It will be understood that in some embodiments, the one or more client devices 20 need not themselves be independent devices, but may be peripheral devices communicatively coupled to other computing devices. In an example embodiment, a client device 20 may be configured to securely store one or more instances of information/data using a hardware-level encryption.

Exemplary Computing Devices

The network device 10 described with reference to FIG. 1 may be embodied by one or more computing devices or servers, such as the example network device 10 shown in FIG. 2. As illustrated in FIG. 2, the network device 10 may include processing circuitry 12, memory 14, communications circuitry 16, input-output circuitry 18, and/or cryptographic circuitry 19, each of which will be described in greater detail below. In some embodiments, the network device 10 may further comprise a bus for passing information between various components of the network device. For example, data bus 13 may relay information/data between the processing circuitry 12 and the memory 14. The network device 10 may be configured to execute various operations described above in connection with FIG. 1 and below in connection with FIGS. 4 and 5.

In some embodiments, the processor 12 (and/or co-processor or any other processing circuitry assisting or otherwise associated with the processor) may be in communication with the memory 14 via a bus for passing information among components of the apparatus. The processor 12 may be embodied in a number of different ways and may, for example, include one or more processing devices configured to perform independently. Additionally or alternatively, the processor may include one or more processors configured in tandem via a bus to enable independent execution of software instructions, pipelining, and/or multithreading. The use of the terms "processor" or "processing circuitry" may be understood to include a single core processor, a multi-core processor, multiple processors of the system computing device 10, remote or "cloud" processors, or any combination thereof.

In an example embodiment, the processor 12 may be configured to execute software instructions stored in the memory 14 or otherwise accessible to the processor. Alternatively or additionally, the processor 12 may be configured to execute hard-coded functionality. As such, whether configured by hardware or software methods, or by a combination of hardware with software, the processor 12 may represent an entity (e.g., physically embodied in circuitry) capable of performing operations according to an embodiment of the present invention while configured accordingly. Alternatively, as another example, when the processor 12 is embodied as an executor of software instructions, the software instructions may specifically configure the processor 12 to perform the algorithms and/or operations described herein when the software instructions are executed.

Memory 14 is non-transitory and may include, for example, one or more volatile and/or non-volatile memories. In other words, for example, the memory 14 may be an electronic storage device (e.g., a computer readable storage medium). The memory 14 may be configured to store information, data, content, applications, software instructions, or the like, for enabling the apparatus to carry out various functions in accordance with example embodiments contemplated herein. In an example embodiment, the memory 14 comprises RAM. For example, the memory 14 comprises static RAM (SRAM), dynamic RAM (DRAM), and/or other forms of RAM. For example, the memory 14 may include working memory, cache memory, and/or the like. In an example embodiment, the memory 14 comprises semiconductor-based read only memory (ROM).

The communications circuitry 16 may be any means such as a device or circuitry embodied in either hardware or a combination of hardware and software that is configured to receive and/or transmit data from/to a network and/or any other device, circuitry, or module in communication with the network device 10. In this regard, the communications circuitry 16 may include, for example, a network interface for enabling communications with a wired or wireless communication network. For example, the communications circuitry 16 may include one or more network interface cards, antennas, buses, switches, routers, modems, and supporting hardware and/or software, or any other device suitable for enabling communications via a network 40. Additionally or alternatively, the communication interface 16 may include the circuitry for causing transmission of such signals to a network or to handle receipt of signals received from a network.

In some embodiments, the network device 10 may include input/output circuitry 18 in communication configured to provide output to a user and, in some embodiments, to receive an indication of user input. The input/output circuitry 18 may comprise a user interface, such as a display, and may further comprise the components that govern use of the user interface, such as a web browser, mobile application, dedicated client device, or the like. In some embodiments, the input/output circuitry 18 may additionally or alternatively include a keyboard, a mouse, a touch screen, touch areas, soft keys, a microphone, a speaker, and/or other input/output mechanisms. The input/output circuitry 18 may utilize the processor 12 to control one or more functions of one or more of these user interface elements through software instructions (e.g., application software and/or system software, such as firmware) stored on a memory (e.g., memory 14) accessible to the processor 12.

In addition, the system computing device 10 further comprises cryptographic circuitry 19. The cryptographic circuitry 19 includes hardware components designed or configured to request, receive, process, generate, and transmit data, data structures, control signals, and electronic information for use in PQC. In some embodiments, the cryptographic circuitry 248 may be configured to encrypt data (e.g., using one or more classical or PQC encryption techniques). In various embodiments, the cryptographic circuitry 19 is configured and/or designed to generate and/or store one or more cryptographic keys (e.g., classical cryptographic keys and/or PQC cryptographic keys). In this regard, the cryptographic circuitry 19 may include, for example, non-PQC cryptographic circuitry 19A and PQC cryptographic circuitry 19B. In some embodiments, the cryptographic circuitry is configured to generate and/or store one or more QOEs and/or one or more QOMs, generate and/or store a key used for determining a path (e.g., a path of locations within the memory where sections of an instance of information/data are stored), and/or the like. In an example embodiment, the PQC cryptographic circuitry 19B comprise a quantum random number generator, quantum coin flipper, a quantum particle, and/or the like. In an example embodiment, a QOM is a mapping between a traditional addressing scheme for a memory (e.g., memory 14 and/or a portion thereof) and a scrambled/obfuscated addressing scheme for the memory. In an example embodiment, the QOM is generated based on one or more QOEs. In an example embodiment, the QOEs may be PQC cryptographic keys initial states of quantum coin flips, collapsed wave functions of one or more quantum particles, and/or the like. For example, in an example embodiment, the PQC cryptographic circuitry 19B comprises one or more quantum particles and/or one or more qubits that provide the basis of a PQC cryptographic key. For example, the PQC cryptographic circuitry 19B may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In some embodiments, the cryptographic circuitry 19 may be configured to authenticate a session (e.g., perform a cryptographic handshake) with a client device 20 over a communications channel based on a cryptographic key. In some embodiments, the cryptographic circuitry 19 may be configured to encrypt the at least a portion of an electronic communication based on a quantum cryptographic key before transmission of the electronic communication to a client device over a communications channel.

The non-PQC cryptographic circuitry 19A includes hardware components designed or configured to request, receive, process, generate, and transmit data, data structures, control signals, and electronic information for use in classical cryptographic techniques. The PQC cryptographic circuitry 19B includes hardware components designed or configured to request, receive, process, generate, and transmit data, data structures, control signals, and electronic information for use in PQC encryption techniques. In various embodiments, the non-PQC cryptographic circuitry 19A and/or the PQC cryptographic circuitry 19B may be configured to decrypt information/data encrypted using classical encryption techniques and/or PQC encryption techniques, respectively.

Although these components 12-19 may in part be described using functional language, it will be understood that the particular implementations necessarily include the use of particular hardware. It should also be understood that certain of these components 12-19 may include similar or common hardware. For example, the cryptographic circuitry 19 may, at times, leverage use of the processor 12 or memory 14, but duplicate hardware is not required to facilitate operation of these distinct components of the network device 10 (although duplicated hardware components may be used in some embodiments, such as those in which enhanced parallelism may be desired). The use of the term "circuitry" as used herein with respect to components of the network device 10 therefore shall be interpreted as including the particular hardware configured to perform the functions associated with the particular circuitry described herein. Of course, while the term "circuitry" should be understood broadly to include hardware, in some embodiments, the term "circuitry" may refer also to software instructions that configure the hardware components of the network entity 10 to perform their various functions.

To this end, each of the communications circuitry 16, input/output circuitry 18, cryptographic circuitry 19 may include one or more dedicated processors, specially configured field programmable gate arrays (FPGA), and/or application specific interface circuit (ASIC) to perform its corresponding functions, these components may additionally or alternatively be implemented using a processor (e.g., processor 12) executing software stored in a memory (e.g., memory 14). In this fashion, the communications circuitry 16, input/output circuitry 18, and/or cryptographic circuitry 19 are therefore implemented using special-purpose components implemented purely via hardware design or may utilize hardware components of the network device 10 that execute computer software designed to facilitate performance of the functions of the communications circuitry 16, input/output circuitry 18, and/or cryptographic circuitry 19.

The client device 20 described with reference to FIG. 1 may be embodied by one or more computing devices, personal computers, desktop computers, client devices (e.g., of the network device 10), and/or mobile devices, such as the example client device 20 shown in FIG. 3. In embodiments where a client device 20 is a mobile device, such as a smartphone or tablet, the mobile device may execute an "app" (e.g., a thin-client application) to interact with the network device 10. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, database server devices, remote server devices, network device 10). Communication with hardware and software modules executing outside of the app is typically provided via APIs provided by the mobile device operating system.

Figure 3:
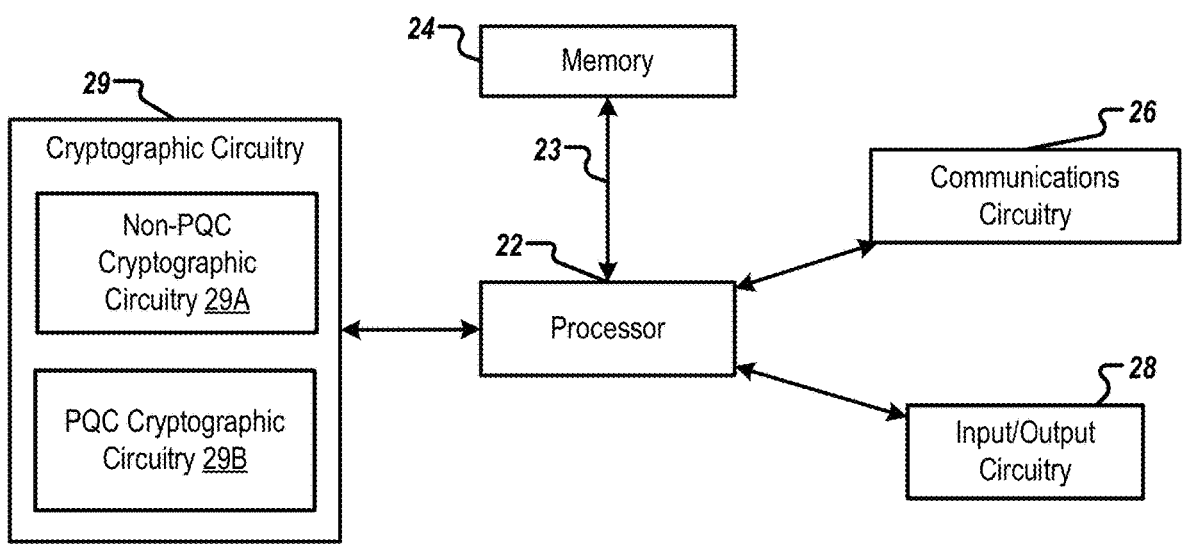
FIG. 3 is a block diagram of a client device that may be specifically configured in accordance with an example embodiment described herein.

The example client device 20 illustrated in FIG. 3 includes processing circuitry and/or processor 22, memory 24, communications circuitry 26, input-output circuitry 28, and cryptographic circuitry 29 (e.g., comprising non-PQC cryptographic circuitry 29A and/or PQC cryptographic circuitry 29B), each of which is configured to be similar to the similarly named components described above in connection with FIG. 2. In various embodiments, the processor 22, memory 24, and input-output circuitry 28 are configured to provide an IUI configured for user interaction (e.g., via the input-output circuitry 28). For example, the IUI may be configured to receive user input initiating a time series request and/or to provide a time series and/or portion thereof.

In some embodiments, various components of the network device 10 and/or client device 20 may be hosted remotely (e.g., by one or more cloud servers) and thus need not physically reside on the corresponding computing device 10, 20. Thus, some or all of the functionality described herein may be provided by third party circuitry. For example, a given computing device 10, 20 may access one or more third party circuitries via any sort of networked connection that facilitates transmission of data and electronic information between the computing device 10, 20 and the third party circuitries. In turn, that computing device 10, 20 may be in remote communication with one or more of the other components describe above as comprising the computing device 10, 20.

As will be appreciated based on this disclosure, example embodiments contemplated herein may be implemented by a network device 10 and/or client device 20. Furthermore, embodiments may take the form of a computer program product on at least one non-transitory computer-readable storage medium (e.g., memory 14, 24) storing software instructions. Any suitable non-transitory computer-readable storage medium may be utilized, some examples of which are non-transitory hard disks, CD-ROMs, flash memory, optical storage devices, and magnetic storage devices. It should be appreciated, with respect to certain network devices 10 as described in FIG. 2 or client devices 20 as described in FIG. 3, that loading the software instructions onto a computer or apparatus produces a special-purpose machine comprising the means for implementing various functions described herein.

Having described specific components of example network devices 10 and client devices 20, example embodiments are described below in connection with a series of flowcharts.

Example Operations for Quantum
Phenomenon-Based Obfuscation of Memory

In various embodiments, a network device 10 and/or a client device 20 may be configured to store one or more instances of information/data using hardware-level encryption. In various embodiments, hardware-level encryption is encryption where the stored information/data is protected by hiding the information/data within volatile or non-volatile memory by, for example, obscuring the address(es) where portions of the information/data are stored in the volatile or non-volatile memory. In various embodiments, an instance of information/data may be sensitive information/data such, but not limited to, a credit card number, social security number, account number, medical information/data, and/or the like. In an example embodiment, the instance of information/data may include computer-executable instructions and/or code.

Various embodiments of hardware-level encryption enable the encrypting of memory from the hardware perspective. For example, example embodiments provide a hardware solution for storing instances of information/data in memory using one or more PQC algorithms (and possibly classical encryption algorithm(s), in some example embodiments). In various embodiments, a QOM is used to redefine addressing of the memory (e.g., RAM or other memory in memory 14, 24). For example, a shift register may be used such that the redefined addressing of the memory can only be performed and/or accessed from the processor 12, 22 associated with and/or coupled to the memory 14, 24. In an example embodiment, the address registers of the memory 14, 24 (and/or a portion thereof) may be altered using a QOM at, for example, the motherboard-level. In an example embodiment, the QOM may act as a random mask. In various embodiments, a QOM may be used to scramble memory addressing at the processor level so as to make it more difficult and/or prevent unauthorized access to instances of information/data stored in the memory. In various embodiments, since the re-assembling of an instance of information/data is performed at the hardware level, the latency associated with decrypting an instance of information/data is considerably less (e.g., approximately zero in an example embodiment) than software-based encryption approaches. For example, decrypting an instance of information/data stored using the hardware-level encryption requires the physical memory chip and/or corresponding processor to efficiently and effectively re-assembly an instance of information/data stored therein. In various embodiments, the cryptographic key used to generate the QOM and/or a locations (e.g., based on the QOM) where the sections of an instance of information/data is stored in the memory is stored in a separate memory (e.g., not in RAM or the same set of memory storing the sections of the instance of information/data). Moreover, in various embodiments, the instance of information/data is not altered. For example, the instance of information/data is disassembled and/or divided into a plurality of sections and the sections are stored in the memory in a "hidden" or masked manner.

In various embodiments, an instance of information/data is stored using quantum phenomenon-based obfuscation of memory by disassembling and/or dividing the instance of information/data into a plurality of sections and assigning each section a storage location within the memory (e.g., RAM and/or other memory of memory 14, 24) by and/or based on a QOM. In an example embodiment, a QOM is a mapping between a traditional addressing scheme for a memory (e.g., memory 14 and/or a portion thereof) and a scrambled addressing scheme for the memory. In an example embodiment, the QOM is generated based on one or more QOEs. In an example embodiment, at least one of the QOEs is a cryptographic key (e.g., a PQC cryptographic key, a classical cryptographic key, and/or the like). For example, in an example embodiment, a QOE is an initial state of a quantum coin flip. For example, a QOE may be a collapsed wave function of a quantum particle associated with the network device 10. For example, the QOM may be generated using a quantum random walk (e.g., one dimensional or two dimensional quantum walk) using a quantum coin flip, quantum random number generator, collapsed wave function of a quantum particle, and/or the like. In an example embodiment, a cryptographic key (e.g., a PQC cryptographic key) may be used to determine a path (e.g., based on a QOM) for storing sections of the instance of information/data within the memory (e.g., RAM and/or other memory of memory 14, 24).

In an example embodiment, the QOM defines a tree representing addresses within the memory (e.g., RAM and/or other memory of memory 14, 24) that have been allocated for storing one or more instances of information/data. In an example embodiment, the space in the memory allocated for storage of the one or more instances of information/data is larger than required for storage of the one or more instances of information/data. For example, the one or more instances of information/data may require X bits for storage thereof and the space allocated for storing the one or more instances of information/data may be $\alpha X$ bits worth of storage space, where $\alpha > 1$. In various embodiments, fake sections may be used to fill up the extra space allocated to storage of the one or more instances of information/data.

In various embodiments, one or more QOEs may be generated and/or determined each time the network device is turned on, booted up, cold started, restarted, and/or the like. for example, the network device 10 may comprise PQC cryptographic circuitry 19B containing a quantum particle that may be observed to determine one or more QOEs. The one or more QOEs may then be used to generate a QOM for use in storing instances of information/data to memory 14 during that use cycle (e.g., until the network device 10 is restarted and/or the like). In various embodiments, a second quantum particle that is entangled with the quantum particle contained by the PQC cryptographic circuitry 19B is stored in a vault and/or the like of a master server. In instances where the network device 10 crashes and/or the like, the second quantum particle may be used to generate one or more QOEs that may be used to regenerate the QOM used by the network device 10 during the use cycle when the crash and/or the like occurred.

Figure 4:
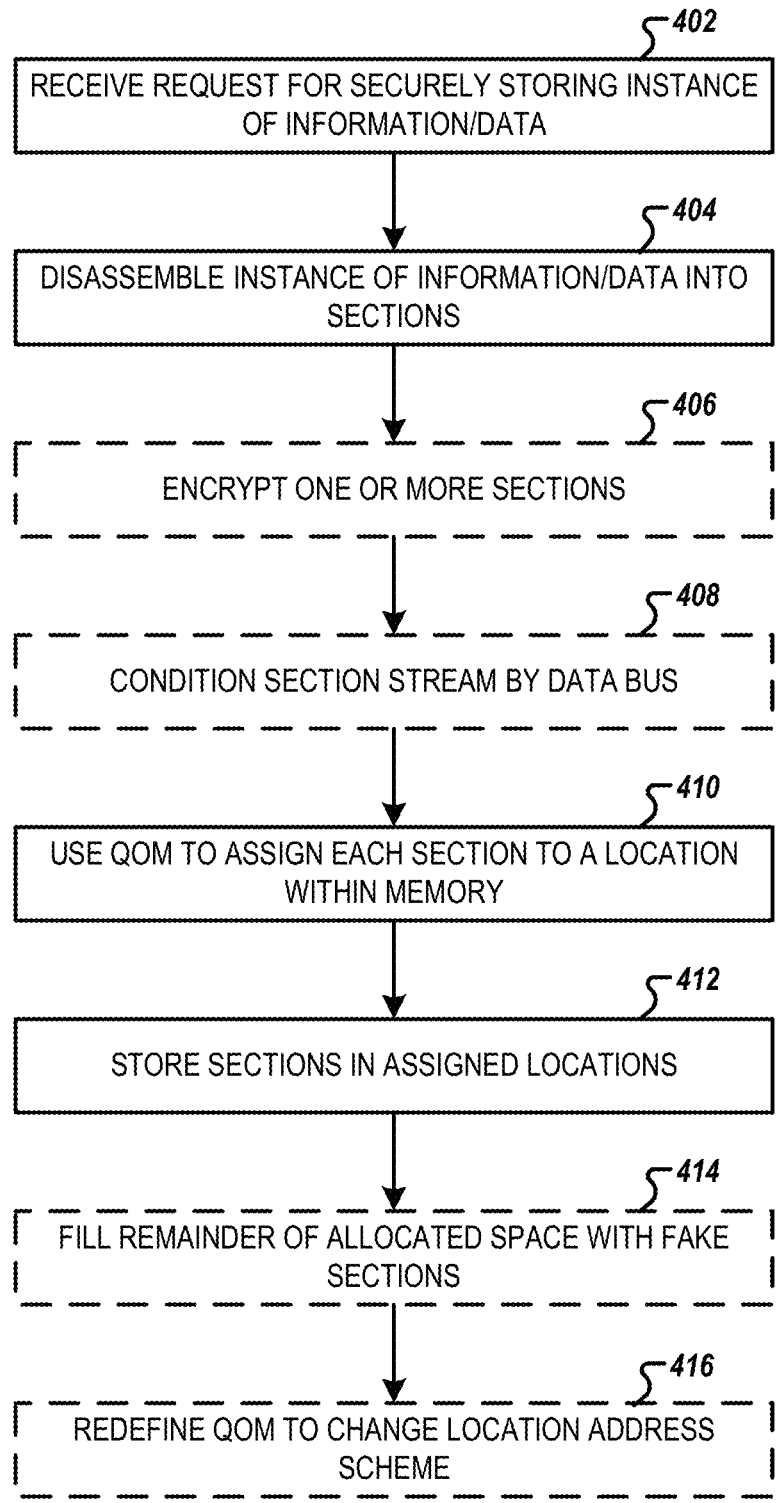
FIG. 4 is a flowchart illustrating operations performed, such as by the network device of FIG. 2 and/or the client device of FIG. 3 to store instances of information/data using quantum phenomenon-based obfuscation of memory, in accordance with an example embodiment described herein.

FIG. 4 provides a flowchart illustrating various processes, procedures, operations, and/or the like that may be performed by a network device 10 and/or a client device 20, in various embodiments, to store an instance of information/data using quantum phenomenon-based obfuscation of memory. In an example embodiment, the quantum phenomenon-based obfuscation is resistant to quantum attacks. Starting at step/operation 402, the processing circuitry 12 of the network device 10 or the processing circuitry 22 of the client device 20 receives a request for storing an instance of information/data securely and/or using quantum phenomenon-based obfuscation to store the instance of information/data. For example, the processing circuitry 12, 22 may operate a program and/or application that causes a request for storing an instance of information/data securely and/or using quantum phenomenon-based obfuscation to store the instance of information/data to be generated and received by the processing circuitry 12, 22 (e.g., in local memory 14, 24). In an example embodiment, the client device 20 may operate a program and/or application that causes a request for storing an instance of information/data securely and/or using quantum phenomenon-based obfuscation to store the instance of information/data to be generated and provided such that the network device 10 receives the request. In various embodiments, an instance of information/data may be sensitive information/data such, but not limited to, a credit card number, social security number, account number, medical information/data, and/or the like. In an example embodiment, the instance of information/data may include computer-executable instructions and/or code. In various embodiments, the request indicates that the instance of information/data should be stored in RAM, working memory, cache memory, and/or the like.

In various embodiments, the request comprises the instance of information/data to be stored along with metadata associated with and/or corresponding to the instance of information/data. For example, the metadata may include a data type corresponding to the instance of information/data, access control/authorization information/data indicating requirements for authorized access to the instance of information/data, and/or the like. In various embodiments, the data type indicates what the instance of information/data is (e.g., address, name, social security number, credit card number, and/or the like).

In various embodiments, in response to receiving and/or processing the request, the processing circuitry 12, 22 may (e.g., via one or more memory registers) allocate space within the memory 14, 24 for storing the instance of information/data. In an example embodiment, the space allocated for storing the instance of information/data is larger than the space required for storing the instance of information/data. For example, the instance of information/data may require X bits for storage thereof and the space allocated for storing the instance of information/data may be $\alpha X$ bits worth of storage space, where the factor $\alpha > 1$. In an example embodiment, the factor $\alpha$ is at least five. In an example embodiment, the factor $\alpha$ is no more than twenty. In an example embodiment, the factor $\alpha$ is ten.

At step/operation 404, the processing circuitry 12, 22 disassembles and/or divides the instance of information/data into sections. In an example embodiment, each of the sections are the same size (e.g., one byte, two bytes, and/or the like). In an example embodiment, different sections of the instance of information/data may be different sizes (e.g., one section may be two bytes and another section may be one byte). In an example embodiment, the size(s) of the sections that the instance of information/data is disassembled and/or divided into is determined based on the data type associated with the instance of information/data.

At step/operation 406, the processing circuitry 12, 22 may optionally encrypt and/or digitally sign one or more of the sections in accordance with an encryption scheme. For example, the processing circuitry 12, 22 may optionally encrypt and/or digitally sign one or more of the sections using a classical/non-PQC encryption using the non-PQC cryptographic circuitry 19A and/or encrypt one or more of the sections using a PQC encryption using the PQC cryptographic circuitry 19B. In various embodiments, a first section may be encrypted using a first type of encryption using a first key and a second section may be encrypted using a second type of encryption using a second key. In an example embodiment, the first and second types of encryption may be different and/or the first and second keys may be different from one another. In various embodiments, an encryption scheme may indicate which sections are to be encrypted and/or digitally signed and with which key and/or digital signature the section should be encrypted and/or signed. In an example embodiment, the encryption scheme may be data type dependent. For example, the encryption scheme corresponding to a particular data type may encrypt the one or two sections that include the most sensitive portion of the instance of information/data. For example, if the instance of information/data is a credit card number, the encryption scheme may indicate that the section that includes the check digit should be encrypted using a particular form of encryption and/or using a particular key. In various embodiments, the one or more encrypted and/or digitally signed sections may include one or more fake sections.

After the processing circuitry 12, 22 has encrypted and/or digitally signed any sections that are going to be encrypted and/or digitally signed, the sections are provided a stream of sections to the memory 14, 24 via data bus 13, 23. For example, the processing circuitry 12 of the network device 10 may provide the stream of sections to memory 14 via data bus 13. In various embodiments, the stream of sections has an order that corresponds to the order in which the sections should be re-assembled to provide the instance of information/data.

At step/operation 408, the data bus 13, 23 may condition the stream of sections. For example, conditioning the stream of sections may include adding a new/fake section based on a sequence rule, switching the position of two or more sections within the stream of sections based on a sequence rule, and/or the like. For example, the sequence rule may indicate that after a particular number of sections, a fake section should be added. For example, after every three sections, a fake section may be added to the stream of sections. In another example, the sequence rule may indicate that for every four section block of the stream of sections, the second and fourth sections should be switched. In an example embodiment, the sequence rule may use a periodicity rule (e.g., after every three sections add a fake section) or may indicate a particular sequence. For example, a fake section may be added in accordance with Fibonacci's sequence as shown in FIG. 4A, where the stream of sections 450 is modified (e.g., by data bus 13, 23) to include fake sections in accordance with Fibonacci's sequence to generate a modified stream of sections 460. In various embodiments, a fake section may be added and/or the order of sections may be switched in accordance with Fibonacci's sequence and/or various other sequences.

In an example embodiment, the data bus 13, 23 may add a sufficient number of fake sections to the stream of sections to account for at least a portion, if not all, of the extra space allocated for storing the instance of information/data. For example, if the instance of information/data requires X bits for storage thereof and the space allocated for storing the instance of information/data is $\alpha X$ bits worth of storage space, where $\alpha > 1$, the data bus 13, 23 may add sufficient fake sections to account for the additional $(\alpha-1)X$ bits of storage space allocated for storing the instance of information/data. In various embodiments, the fake sections are generated based on a data type associated with the instance of information/data. For example, if the data type associated with the instance of information/data indicates that the instance of information/data is a credit card number, the fake sections may be and/or appear to be of the data type credit card number.

Returning to FIG. 4, at step/operation 410, a QOM is used to assign a location within the memory for each section in the stream of sections. For example, the processing circuitry 12, 22 and/or memory 14, 24 may apply and/or use the QOM to assign each section in the stream of sections a location within the memory for storage of the section. For example, in an example embodiment, the QOM is a mapping between a traditional addressing scheme for a memory (e.g., memory 14 and/or a portion thereof) and a scrambled/obfuscated addressing scheme for the memory. As used herein, a location is an address within the allocated portion of the memory 14, 24 for storing the instance of information/data that corresponds to the QOM's addressing scheme. In an example embodiment, the QOM corresponds to a quantum state of a quantum particle and/or qubit stored and/or monitored by the cryptographic circuitry 19 (and/or other hardware and/or software modules configured to perform cryptographic functions). For example, the quantum state (e.g., collapsed wave function of the quantum particle) may be used as a QOE that is used to define the path of locations (and/or how the locations correspond to addresses of the memory 14, 24) that correspond to storage of the instance of information/data.

For example, the cryptographic circuitry 19, 29 (and/or other hardware and/or software modules configured to perform cryptographic functions) may contain a quantum particle that may be used to determine a particular quantum state (e.g., by collapsing the wave function of the quantum particle and/or the like). The quantum state is then used as a QOE, and/or the like used to create the QOM. For example, a tree of addresses within the memory may be defined and one or more QOE may be used to determine a path through the tree (e.g., as a quantum coin flip or dice roll, for example). the path taken through the tree of addresses defines the QOM. The QOM thereby enables a "scrambled" storing of the sections of the instance of information/data such that a bad actor would not be able to easily and/or quickly identify where in the memory to look for an instance of information/data or how to reassemble an instance of information/data. In various embodiments, the QOEs and/or QOM are generated and/or stored using board-level firmware to enable quick and efficient use of the QOM for assigning locations for storing the sections of the instance of information/data.

In various embodiments, the QOM is generated based on one or more QOEs. In an example embodiment, the QOEs and/or QOM are generated using quantum cryptographic circuitry 19B. In an example embodiment, the QOEs and/or QOM are generated using board level firmware. In an example embodiment, a one or two dimensional quantum random walk (e.g., based on one or more QOEs such as a quantum coin flip and/or the like) may be used to build a QOM. Locations assigned to the sections in the stream of sections are then assigned based on the QOM. In an example embodiment, the QOM is a mapping between a traditional addressing scheme of the memory and the obfuscated addressing of the memory (e.g., as determined based on the random quantum walk and/or the like). The QOM is accessed and used to assign locations (e.g., addresses based on the QOM) to sections of the stream of sections. For example, a first location may be assigned to a first section of the stream based on the QOM, a subsequent, second location that is assigned to a subsequent, second section of the stream based on the QOM, etc. As noted above, the QOEs used to generate the QOM is not stored in the same memory as the sections of the instance of information/data. For example, the QOM and/or QOEs used to generate the QOM may be stored by the cryptographic circuitry 19 (and/or other hardware and/or software module(s) configured to perform cryptographic functions).

At step/operation 412, the memory 14, 24 stores each section of the stream of sections in the corresponding assigned location. For example, the first section is stored in the first location, the second section is stored in the second location, and/or the like. However, as the location assigned to each section is a masked or hidden address due to the application or use of the QOM, a blind attempt to access the sections of the instance of information/data from the memory 14, 24 based on the locations themselves and without knowledge of the QOM, is unlikely to result in identifying sections of the instance of information/data and reassembling those sections in a correct manner.

At step/operation 414, if additional space in the memory 14, 24 was allocated for storage of the instance of information/data that was not filled by storing the sections in the stream of sections, the processing circuitry 12, 22 may cause the memory 14, 24 to store one or more fake sections within the additional space. For example, the processing circuitry 12, 22 may generate one or more fake sections (e.g., based on the data type associated with the instance of information/data) and cause the fake sections to be stored in the portion of the memory 14, 24 that is allocated for storing the instance of information/data. For example, any additional space in the memory 14, 24 that was allocated for storage of the instance of information/data that was not filled by storing the sections in the stream of sections may be filled with fake sections.

At step operation 416, the cryptographic circuitry 19 (and/or other hardware and/or software modules configured to perform cryptographic functions) may optionally change the QOM. For example, the QOM may be periodically changed and/or a new QOM may be periodically generated (e.g., once a day, twice a day, every other hour, every hour, upon start up and/or restart of the network device 10, and/or the like). For example, the QOM may be changed and/or a new QOM may be generated in response to an identified trigger (e.g., human and/or machine user request for a new/changed QOM and/or the like). For example, one or more new QOEs may be generated and used to generate a new QOM. In an example embodiment, the cryptographic circuitry 19 (and/or other hardware and/or software modules configured to perform cryptographic functions) may generate a new QOM (e.g., based on one or more new QOEs such as a new collapsed wave function for the quantum particle contained by the PQC cryptographic circuitry 19B, and/or the like) and store the new/changed QOM. In an example embodiment, the cryptographic circuitry 19 (and/or other hardware and/or software modules configured to perform cryptographic functions) may generate and/or store a mapping between previous QOMs and the current QOM.

Thus, the instance of information/data may be securely stored using the quantum-phenomenon-based obfuscation of memory. In various embodiments, the quantum-phenomenon-based obfuscation of memory is quantum-resistant.

Figure 5:
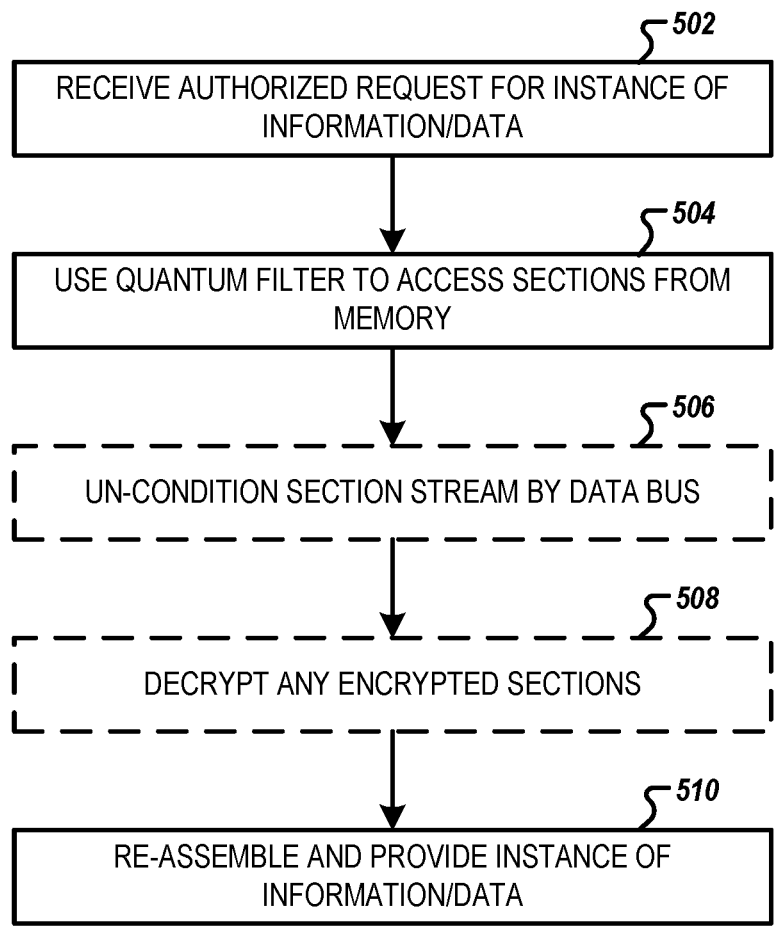
FIG. 5 is a flowchart illustrating operations performed, such as by the network device of FIG. 2 and/or the client device of FIG. 3 to access instances of information/data stored using quantum phenomenon-based obfuscation of memory, in accordance with an example embodiment described herein.

In various embodiments, it may be desirable to access an instance of information/data stored using quantum-phenomenon-based obfuscation of memory. FIG. 5 provides a flowchart illustrating various processes, procedures, operations and/or the like performed by a network device 10 and/or a client device 20 for accessing an instance of information/data stored using hardware-level encryption.

Starting at step/operation 502, the processing circuitry 12, 22 of the network device 10 and/or client device 20 receives an authorized request to access the instance of information/data. For example, the request may be generated and/or provided by a user (e.g., human user and/or machine user) and/or a device that is authorized to access the instance of information/data. For example, operation of an application and/or program on the network device 10 and/or client device 20 may cause a request to access the instance of information/data to be generated and provided to the processing circuitry 12, 22 of the computing device (e.g., network device 10 and/or client device 20) securely storing the instance of information/data. In an example embodiment, the request to access the instance of information/data may indicate that the instance of information/data should be provided as input to another application and/or program executing on the network device 10 and/or client device 20, provided to another computing device (e.g., a computing device associated with the automated clearing house (ACH)), displayed via input/output circuitry 18, 28 of the network device 10 and/or client device 20, and/or the like. In an example embodiment, the request for access to the instance of information/data is considered authorized because the request for access is accompanied by and/or comprises a token, authorization information/data, credentials, and/or the like that, that satisfy the access control/authorization information/data of the metadata associated with the instance of information/data.

At step/operation 504, the processing circuitry 12, 22 uses the QOM stored and/or generated by cryptographic circuitry 19 (and/or other hardware and/or software modules configured to perform cryptographic functions) to determine the locations where the sections corresponding to the instance of information/data were stored within the memory. For example, the processing circuitry 12, 22 may use the QOM, stored and/or generated by the cryptographic circuitry 19 (and/or other hardware and/or software modules configured to perform cryptographic functions) to determine the locations that were assigned to the sections of the stream of sections. The sections may then be accessed from the memory 14, 24 to form an accessed stream of sections that are returned to the processing circuitry 12, 22 from the memory 14, 24. For example, the processing circuitry 12, 22, may read an accessed stream of sections from the memory 14, 24 based on the QOM and/or the like. In an example embodiment, the accessed stream of sections may be provided from the memory 14, 24 to the processing circuitry 12, 22 by the data bus 13, 23.

At step/operation 506, if the data bus 13, 23 conditioned the stream of sections when the sections were being stored in the memory 14, 24, the data bus 13, 23 may un-condition the accessed stream of sections. For example, if the data bus 13, 23 conditioned the stream of sections by adding fake sections periodically and/or in accordance with a sequence, the data bus 13, 23 may remove sections of the accessed stream of sections in accordance with the periodicity and/or sequence with which the fake sections were added. In another example, if the data bus 13, 23 conditioned the stream of sections by switching the order of various sections within the stream of sections, the data bus 13, 23 may un-condition the accessed stream of sections by switching the order of various sections in reverse from the conditioning of the stream.

At step 508, if the processing circuitry 12, 22 (and/or cryptographic circuitry 19, 29) encrypted any of the sections in the stream of sections, the processing circuitry 12, 22 (and/or cryptographic circuitry 19, 29) may decrypt the encrypted sections. For example, the processing circuitry 12, 22 may cause the cryptographic circuitry 19 (and/or another hardware and/or software module configured to perform cryptographic functions) to decrypt and/or unencrypt one or more sections in the accessed stream of sections based on the encryption scheme used to encrypt one or more of the sections of the instance of information/data. Similarly, if the processing circuitry 12, 22 (and/or cryptographic circuitry 19, 29) digitally signed any of the sections in the stream of sections, the processing circuitry 12, 22 (and/or cryptographic circuitry 19, 29) may check for the appropriate digital signatures (e.g., based on the encryption scheme) in the accessed stream of sections. If a section of the accessed stream of sections was not signed by the appropriate digital signature, according to the encryption scheme, an error may be returned.

At step 510, the processing circuitry 12, 22 re-assembles the instance of information/data from the accessed stream of sections. For example, the sections in the accessed stream of sections (after any un-conditioning and/or decrypting has been performed) may be combined to re-assemble the instance of information/data. For example, the sections in the accessed stream of sections (after any un-conditioning and/or decrypting has been performed) may be concatenated together in the order in which the sections appear in the accessed stream to re-assemble the instance of information/data.

In various embodiments, after the instance of information/data has been re-assembled, the instance of information/data is provided in accordance with the request for accessing the instance of information/data. For example, the instance of information/data may be provided (e.g., transmitted) to a network device 10, another computing device (e.g., a computing entity of an ACH network), and/or a client device 20 to be displayed and/or otherwise provided via input/output circuitry 18, 28 and/or provided as input to an application and/or program operating on the computing device. In various embodiments, the instance of information/data is provided to a computing device having appropriate credentials for receiving the instance of information/data (e.g., as indicated by access control/authorization information/data in the metadata associated with the instance of information/data). In an example embodiment, the network device 10 and/or client device 20 that had stored the instance of information/data may display and/or otherwise provide the instance of information/data (e.g., via input/output circuitry 18, 28) and/or provide the instance of information/data as input to an application and/or programming operating thereon.

Technical Advantages

Various embodiments provide improvements to the technical field of data encryption and secure storage of information/data. In some embodiments, no software-based encryption is used and/or a minimal number of sections are encrypted using software-based encryption (e.g., the minimum number of sections that include the most sensitive portions of the instance of information/data as determined based on the data type of the instance). Thus, the latency required for decrypting the instance of information/data is significantly less than traditional software-based encryption. In some embodiments, the data bus that transports the stream of sections from the processing circuitry to the memory conditions and, upon authorized access, un-conditions the stream of sections. Thus, even if a bad actor were able to perform a memory dump and then determine the locations corresponding to the storage of the stream of sections, the attempt to re-assemble the instance of information/data would provide a scrambled instance and/or an instance including fake sections. Indeed, one would need both the memory and the data bus used to store the instance of information/data to easily and/or timely re-assemble the instance of information/data. Moreover, the memory of a first network device would be arranged differently from the memory of a second network device, even if the two network devices were configured in the same manner. Thus, a bad actor would not be able to quickly and easily determine a location where certain information/data could be expected to be found in multiple network devices. Therefore, various embodiments provide a hardware-level encryption using the quantum phenomenon-based obfuscation of memory to store instances of information/data securely in RAM and/or other memory. Various embodiments provide improvements to art of encryption and/or secure storage of information/data by providing a low latency, secure encryption.

Conclusion

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the network device and/or client device. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for storing an instance of information/data using quantum phenomenon-based obfuscation of memory or disk storage, the method comprising:
receiving, by processing circuitry, the instance of information/data;
disassembling, by the processing circuitry, the instance of information/data into a plurality of sections;
for each of the plurality of sections, assigning, by the processing circuitry, a location in an allocated portion of the memory or disk storage, wherein each location is determined based at least in part on a quantum obfuscation map (QOM), wherein:
the QOM is generated based on one or more quantum obfuscation elements (QOEs) corresponding to a quantum state of a quantum particle,
the QOM is generated based on a traversed path through a stored tree of addresses, and the traversed path is determined based on the one or more QOEs; and
causing, by the processing circuitry, each of the plurality of sections to be stored at a corresponding assigned location in the allocated portion of the memory or disk storage.

2. The method of claim 1, further comprising encrypting one or more sections of the plurality of sections and storing each of the one or more encrypted sections in a corresponding assigned location.

3. The method of claim 2, wherein the one or more sections are encrypted in accordance with an encryption scheme that corresponds to a data type associated with the instance of information/data.

4. The method of claim 1, further comprising, while passing the plurality of sections to the allocated portion of the memory or disk storage from the processing circuitry by a data bus, conditioning the plurality of sections by the data bus, wherein conditioning the plurality of sections comprises at least one of (a) adding one or more fake sections to the plurality of sections or (b) changing the order of two or more sections of the plurality of sections in accordance with a periodicity or a sequence.

5. The method of claim 1, wherein at least one QOE of the one or more QOEs is a collapsed wave function of a quantum particle.

6. The method of claim 1, wherein the QOM and the one or more QOEs are not stored in the same memory or disk storage as the plurality of sections.

7. The method of claim 1, wherein the allocated portion of the memory or disk storage is larger in size than required for storing the plurality of sections and the method further comprises storing one or more fake sections in a remainder of the allocated portion of the memory or disk storage.

8. The method of claim 7, wherein the one or more fake sections are generated to appear to be of a same data type as the data type associated with the instance of information/data.

9. The method of claim 1, further comprising providing the instance of information/data by accessing an accessed stream of sections based on the QOM and combining sections of the accessed stream of sections in order to re-assemble the instance of information/data.

10. The method of claim 1, wherein the memory or disk storage is random access memory (RAM) or read only memory (ROM).

11. The method of claim 1, further comprising:
generating, by a cryptographic circuitry, one or more pairs of entangled quantum particles, wherein (i) each pair of entangled quantum particles comprises a first quantum particle and a second quantum particle and (ii) the one or more QOEs are determined based on either the first quantum particle or the second quantum particle of a corresponding pair of entangled quantum particles; and
storing, by the cryptographic circuitry, either the first quantum particle or the second quantum particle of each pair of entangled quantum particles.

12. A computing device comprising processing circuitry, cryptographic circuitry configured to store and/or generate a quantum obfuscation map (QOM), and memory or disk storage storing computer executable instructions, the computer executable instructions configured to, when executed by the processing circuitry, cause the computing device to at least:

receive, by the processing circuitry, an instance of information/data;

disassemble the instance of information/data into a plurality of sections;

for each of the plurality of sections, assign a location in an allocated portion of the memory or disk storage, wherein each location is determined based at least in part on the QOM, wherein:

the QOM is generated based on one or more quantum obfuscation elements (QOEs) corresponding to a quantum state of a quantum particle, the QOM is generated based on a traversed path through a stored tree of addresses, and the traversed path is determined based on the one or more QOEs; and cause each of the plurality of sections to be stored at a corresponding assigned location in the allocated portion of the memory or disk storage.

13. The computing device of claim 12, wherein the computer executable instructions are further configured to, when executed by the processing circuitry, cause the computing device to at least encrypt one or more sections of the plurality of sections and store each of the one or more encrypted sections in a corresponding assigned location.

14. The computing device of claim 13, wherein the one or more sections are encrypted in accordance with an encryption scheme that corresponds to a data type associated with the instance of information/data.

15. The computing device of claim 12, wherein the computer executable instructions are further configured to, when executed by the processing circuitry, cause the computing device to at least, while passing the plurality of sections to the allocated portion of the memory or disk storage from the processing circuitry by a data bus, condition the plurality of sections by the data bus, wherein conditioning the plurality of sections comprises at least one of (a) adding one or more fake sections to the plurality of sections or (b) changing the order of two or more sections of the plurality of sections in accordance with a periodicity or a sequence.

16. The computing device of claim 12, wherein at least one of the one or more QOEs is a collapsed wave function of a quantum particle contained by the cryptographic circuitry.

17. The computing device of claim 12, wherein the allocated portion of the memory or disk storage is larger in size than required for storing the plurality of sections and the computer executable instructions are further configured to, when executed by the processing circuitry, store one or more fake sections in a remainder of the allocated portion of the memory or disk storage.

18. The computing device of claim 12, wherein the computer executable instructions are further configured to, when executed by the processing circuitry, cause the computing device to at least provide the instance of information/data by accessing an accessed stream of sections based on the QOM and combining sections of the accessed stream of sections in order to re-assemble the instance of information/data.

19. The computing device of claim 12, wherein the computer executable instructions are further configured to, when executed by the processing circuitry, cause the computing device to store one or more fake sections in a remainder of the allocated portion of the memory or disk storage, wherein the one or more fake sections are generated to appear to be of a same data type as the data type associated with the instance of information/data.

20. A computer program product for storing an instance of information/data using quantum phenomenon-based obfuscation of memory or disk storage, the computer program product comprising at least one non-transitory computer-readable storage medium storing program instructions that, when executed, cause an apparatus to:

receive the instance of information/data;

disassemble the instance of information/data into a plurality of sections;

for each of the plurality of sections, assign a location in an allocated portion of the memory or disk storage, wherein each location is determined based at least in part on a quantum obfuscation map (QOM), wherein:

the QOM is generated based on one or more quantum obfuscation elements (QOEs) corresponding to a quantum state of a quantum particle, the QOM is generated based on a traversed path through a stored tree of addresses, and the traversed path is determined based on the one or more QOEs; and cause each of the plurality of sections to be stored at a corresponding assigned location in the allocated portion of the memory or disk storage.

\* \* \* \* \*